April 11, 1961 R. G. SHELLEY 2,979,711
FIRE CONTROL SYSTEM
Filed June 29, 1956 3 Sheets-Sheet 1

INVENTOR.
RULON G. SHELLEY
BY William R. Lane
ATTORNEY

INVENTOR.
RULON G SHELLEY
BY William Rhem
ATTORNEY

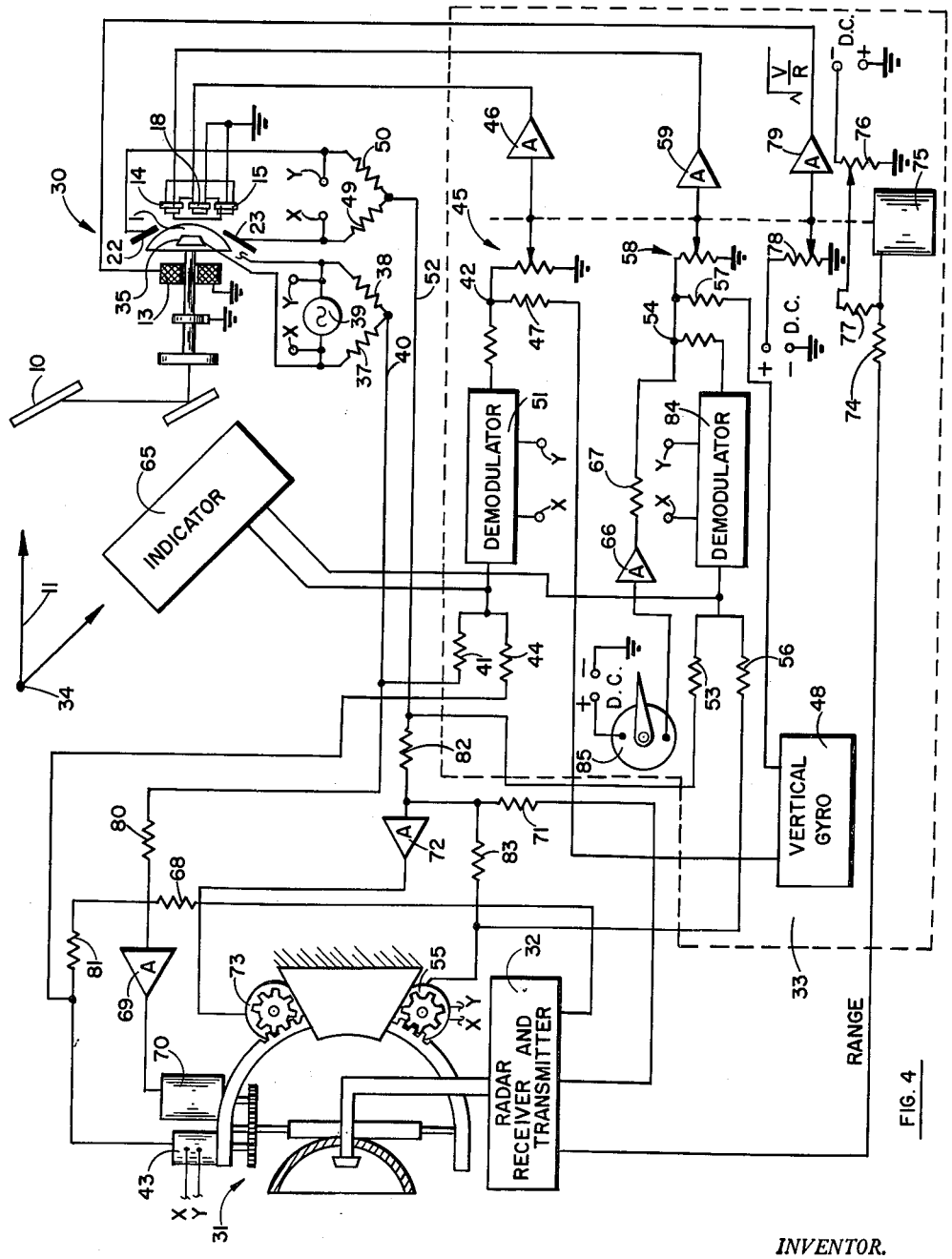

United States Patent Office 2,979,711
Patented Apr. 11, 1961

2,979,711

FIRE CONTROL SYSTEM

Rulon G. Shelley, Downey, Calif., assignor to North American Aviation, Inc.

Filed June 29, 1956, Ser. No. 595,571

23 Claims. (Cl. 343—7)

This invention is a fire control system in which a gyroscopic sight is used in conjunction with radar. This devices provides an all-weather fire control system having improved tracking characteristics.

A common type of sighthead is one which includes a gyroscope which disturbs a reticle to a lead angle dependent on the turning rate of the gyroscope case, or the structure to which the sight is connected. In addition, the gyroscopic sighthead may be controlled in its lead angle by electrical signals which are computed from functions of range, gravity drop, and other information which effects the fire control problem.

Radar systems capable of tracking targets automatically are well-known within the art. The receiver indicates the elevation error and azimuth error of the radar antenna. A servo system acts to drive the radar antenna to zero error and thus tracks the target. It is proposed herein that an all-weather capability be provided by combination of a gyroscopic sighthead with a radar system. A computer is necessary in order to most advantageously use the signals which can be obtained from comparing the gyroscopic sighthead signals with the signals of antenna position provided by the radar.

An advantage which can be gained from such a combination is that greater stability of the gyro sight system is possible, giving the pilot more stable visual information. In addition, by connecting the radar indicator to receive the difference signal between the deflection of the gyroscope and the radar aim, blind firing capabilities can be obtained. The pilot, in such an instance views the radar indicator and has the benefit of both the radar and the gyro sight system.

The scheme allows the self-tracking radar to be utilized, without interfering with its designed functions. The range signal provided by the radar can be used to make further correction in the sighthead. Also, a comparison of the azimuth and elevation angles of the radar antenna with those of the sighthead provides information for computation. Thus, the dynamic characteristics of the sighthead are improved and the pilot finds it considerably easier to put the sighthead reticle on the target.

It is, therefore, an object of the invention to provide an improved all-weather fire control system.

It is still another object of this invention to provide a fire control system with improved dynamic characteristics.

Still another object of this invention is to provide a gyroscopic sighthead system combined with a radar system.

A still further object of this invention is to provide an error stabilized gyroscopic sighthead.

A still further object of this invention is to provide a gyroscopic sighthead having improved time response.

Another object of this invention is to provide a gyroscopic sighthead receiving radar range signal and an azimuth and elevation error signal.

Other objects of invention will become apparent from the following description taken in connection with the accompanying drawings, in which Fig. 1 is a gyroscopic computing sighthead, shown partially in section;

Fig. 4 is a diagram of a second embodiment of the device of the invention in which the sighthead gyroscope is used to stabilize the radar antenna.

Figure 1:
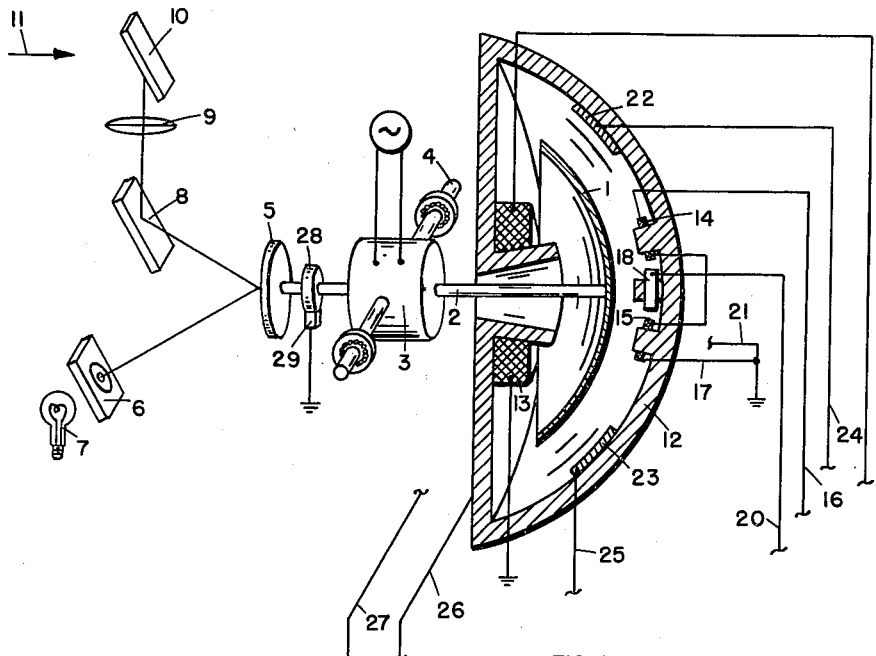

Referring now to Fig. 1, which illustrates a gyroscopic sighthead, a gyro motor 1 is connected to a shaft 2 and caused to be rotated at constant speed by motor 3, which is mounted for rotation about shaft 4, providing a mounting known as a Hooke's joint for shaft 2 and rotor 1. In consequence, shaft 2 may rotate about its own axis and also rotate about the shaft axis of shaft 4. Rotor 1 is an eddy current dome and acts as gyroscope. Flat circular mirror 5 is mounted on the end of shaft 2. A reticle plate 6 is located in front of a small lamp 7 and casts a reticle on the surface of flat mirror 5 which is reflected to plate 8 through lens 9 and onto transparent plate 10. A pilot looking along arrow 11 looks through the plate 10 at a target but also sees the projection of the reticle on plate 10. As this sighthead is caused to turn and follow a target, gyroscope rotor 1 deflects, causing mirror 5 to deflect; and the reticle on plate 10 disturbs off to a lead angle depending, in part, on the angular velocity of the turn. Surrounding rotor 1 is a ferromagnetic case 12. A range coil 13 is utilized to induce a magnetic field in case 12. Rotor 1, being a conductive type disc and being disposed in the air gap of ferromagnetic case 12, has currents induced therein. The greater the current flowing in range coil 13 (indicating a greater range), the less deflection occurs in gyro rotor 1, consequently, the smaller the lead angle of the reticle projected on plate 10. This device is known in the art as an eddy current dome gyro. Additional vertical deflection coils for certain corrections are indicated at 14 and 15 and the output lines are 16 and 17. A similar part of deflection poles 18 and 19 (not shown) are located at right angles to poles 14 and 15 so as to cause deflection in the horizontal direction. The output lines of poles 18 and 19 are indicated at 20 and 21.

In order to provide electrical signals as to the deflection of gyroscope rotor 1, capacitance plates 22 and 23 are located on case 1. The output connections of these capacitive plates are lines 24 and 25. These plates determine the deflection in elevation of the rotor 1. A similar pair of capacitive plates 35 and 36 (not shown) are located at right angles to these plates to determine the deflection in azimuth and the electrical outputs are received on output lines 26 and 27. Rotor 1 provides the other plate of the capacitor and is connected through shaft 2, slip-ring 28, and brush 29, to ground. Thus, it is possible to control the rotor deflection according to a signal which is a function of range, to electrically deflect rotor 1 in elevation or azimuth according to computed signals and also to provide electrical signals indicating the amount of deflection of the gyroscope in elevation or in azimuth. Deflection of the gyroscope may be detected by other well-known means such as electromagnetic pickoffs or resolvers.

Figure 2:
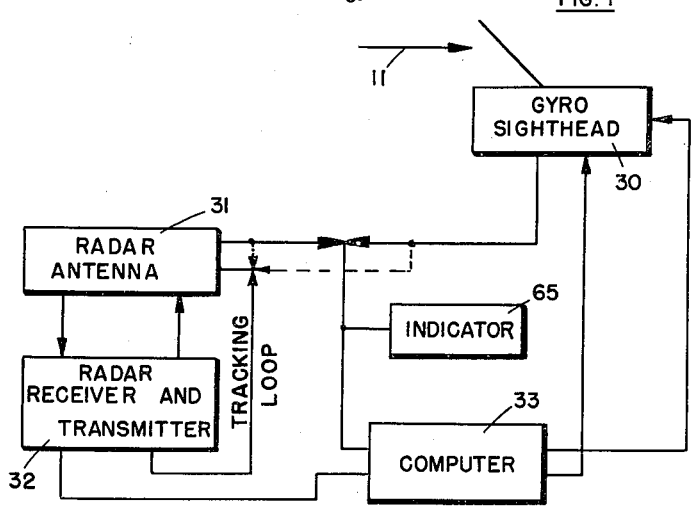
Fig. 2 is a block diagram illustrating the flow of information between the gyroscopic computing sighthead and the radar unit and the computer.

Referring now to Fig. 2, a block diagram illustrates the interconnection between the gyroscopic sighthead, the radar system and a computer. The pickoff signals indicating the deflection of the gyroscope are received from the gyroscopic sighthead 30 and compared with the pick-off signals from the radar antenna 31 which indicate the radar antenna azimuth and elevation. Block 32 illustrates the radar receiver and transmitter which provides signals to the radar antenna to be transmitted and receive signals from the radar antenna. The radar antenna is connected in a closed tracking loop, in servo fashion commonly known, so that the radar antenna tracks the target so as to keep the antenna elevation error and antenna azimuth error at zero. The range signal provided by the transmitter and receiver 32 is transmitted to computer 33 together with the signals indicating the difference between the radar antenna azimuth and elevation and the gyroscope deflection. A radar indicator 65 is connected to receive the error signal which indicates the difference between the radar aim and the gyroscopic sighthead deflection. The vertical plates of the indicator are connected, for example, to receive the signal representing the difference between the deflection of the gyroscope in elevation and the aim of the antenna in elevation. The horizontal plates are connected, for example, to receive the signal representing the difference between the deflection of the gyroscope in azimuth and the aim of the antenna is azimuth.

It is to be noted that this system allows the self-tracking radar to continue to operate in fully self-tracking fashion, and no lag from the gyroscope sighthead is introduced into the radar system.

Figure 3:
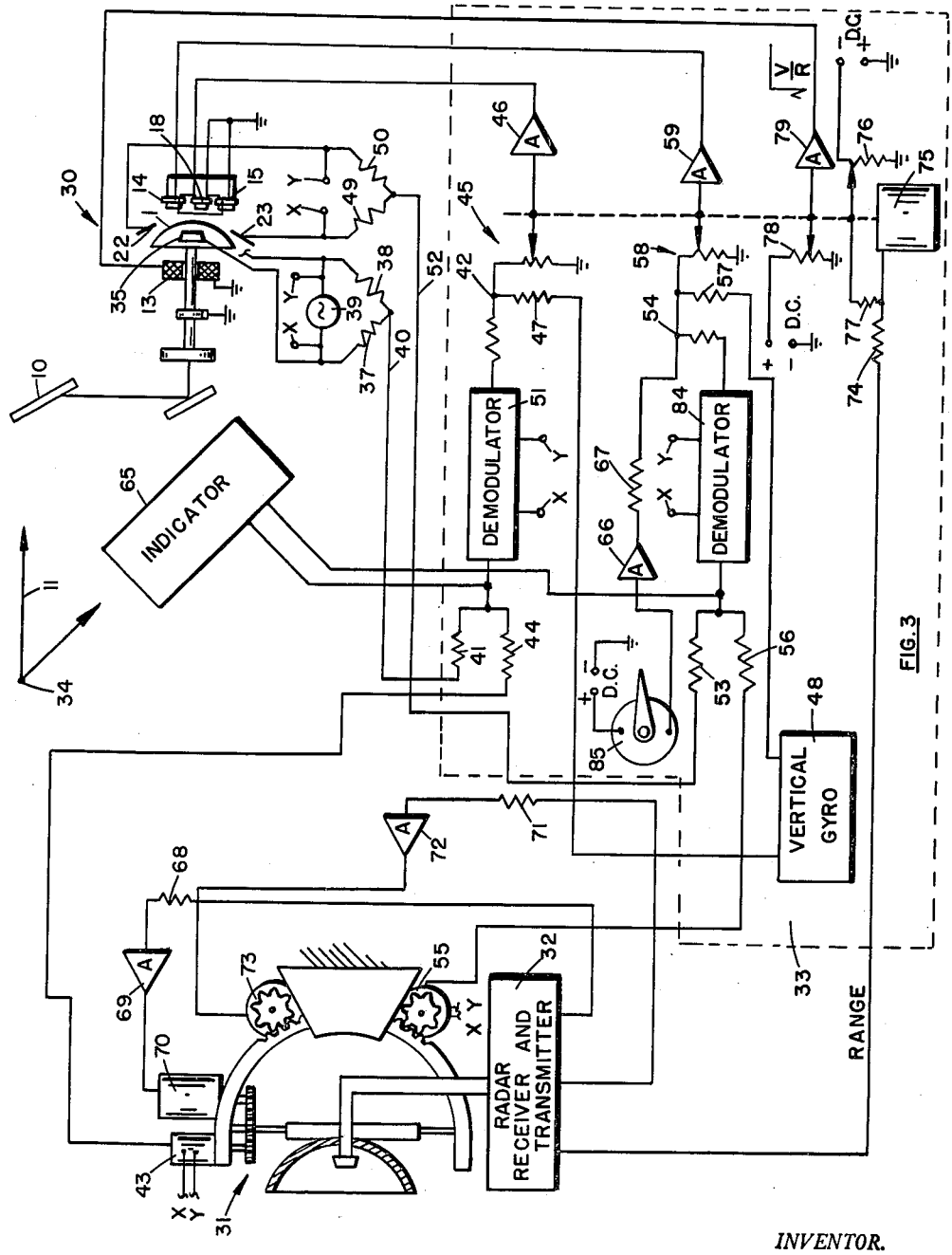
Fig. 3 is a diagram of a first embodiment the device of the invention showing the interconnections between the gyroscopic sighthead, the radar antenna, the radar receiver, the transmitter, and various computer elements of the fire control system.

Fig. 3 is an illustration more fully indicating the interconnections and illustrating one mechanization of computer 33. If, for example, the device is contained in an aircraft, the pilot may be situated to view the radar indicator and the optical sighthead from point 34 during a tracking maneuver. As the aircraft turns, the gyro rotor 1 will deflect causing the reticle on plate 10 to be displaced to give an optical lead angle. The capacitor plates 22, 23, 35 and 36 (not shown) provide output signals indicating the amount of deflection of rotor 1. The output signals from capacitor plates 35 and 36 are connected in a bridge circuit with resistors 37 and 38 which is excited by an A.-C. source 39. The output of the bridge circuit is taken on line 40 and passed to resistor 41 to a demodulator 51 and then to summing point 42. Demodulator 51 receives the reference frequency from source 39 on lines $x$, $y$. Azimuth pickoff 43 indicates the angular position of antenna 31 and provides an electrical signal through resistor 44 to demodulator 51 and thence summing point 42 to be compared with the gyroscope azimuth signal. This signal at point 42 is expressed across potentiometer 45. The output from the wiper of potentiometer 45 passes through amplifier 46 and drives the azimuth deflection coils 18 and 19 (not shown) of the gyroscopic sighthead. Inasmuch as azimuth deflection may be effected by drop due to gravity, a vertical gyro 48 provides an electrical signal indicating the amount that gravity will affect the projectile. This signal is provided through resistor 47 to point 42 to be combined as part of the azimuth deflection signal of the gyroscope. The elevation deflection signal of gyroscope 30 is detected in a bridge circuit comprised of resistors 49 and 50, which bridge circuit is excited by A.-C. source 39 through lines $x$, $y$. The output signal is provided on line 52 through resistor 53 to demodulator 84 and thence to summing point 54. Elevation resolver 55 on antenna 31 provides an electrical signal indicating the elevation of the antenna through resistor 56 to demodulator 84 and thence to summing point 54. Vertical gyro 48 provides an electrical signal representing the effect of gravity on the elevation of the projectile. This signal is provided through resistor 57 to summing point 54. The summing point 54 is connected to potentiometer 58 whose output is connected to amplifier 59 which drives the elevation deflection coils 14 and 15 of gyroscopic sighthead 30. The elevation offset signal might be further desirably modified by the angle of attack obtained from an angle of attack indicator 85 whose vane is mounted to rotate about the pitch axis of the airplane in the airstream of the airplane. Amplifier 66 receives the electrical signals from angle of attack indicator 85 and passes signals through resistor 67 to summing point 54.

At point 42, then, is compared the azimuth deflection of the gyroscope with the azimuth angle of the antenna and the comparison is combined with certain other corrections to provide a signal to the azimuth deflection coils 18 and 19. At point 54 is compared the elevation deflection of the gyroscope with the elevation of the antenna and, upon addition of angle of attack signal and gravity signal, provides a signal to the elevation deflection coils 14 and 15 of the gyroscope. Thus, the gyroscope is being caused to deflect according to the difference between the deflection of the gyro and the aim of the antenna.

A self-tracking radar as illustrated in which the receiver and transmitter 32 and the antenna 31 comprises a self-tracking unit, the output of the receiver portion of 32 provides an azimuth error signal through resistor 68 to amplifier 69 to drive azimuth servo motor 70 and thus position the antenna in azimuth. The antenna elevation error is provided through resistor 71 to amplifier 72 which drives servo motor 73 to control the antenna in elevation. The range signal provided by the radar is transmitted through a resistor 74 to a motor 75 which provides a particular function of the range signal. The output shaft of motor 75 drives the wiper of non-linear potentiometer 76 which feeds back to resistor 77 a voltage which causes motor 75 to respond non-linearly to the range output of the radar system. This is accomplished by the non-linear potentiometer which may be wound to provide desired response of motor 75 to give the desired function of the range signals. The shaft of motor 75 is driven according to inverse function of range, $$\sqrt{\frac{V}{R}}$$

where $V$ is a predetermined value representing the relative projectile velocity with respect to the aircraft. The wipers of potentiometers 45, 58 and 78 are positioned by the shaft of motor 75. In this way, all deflection coil signals are varied according to the inverse function of range, $$\sqrt{\frac{V}{R}}$$

That is, as the range gets greater the deflection signal becomes less.

The equation of summed electrical signals, $E_1$, at point 42 is:

$$E_1 = k_1 E_{az} - k_2 E'_{az} + k_3 G_{az} \quad (1)$$

where
$E_{az}$ is the signal of azimuth deflection of the gyroscope
$E'_{az}$ is the signal of the azimuth angle of the radar antenna
$G_{az}$ is the vertical gyroscope signal indicating the azimuth effect of gravity on the fire control problem, and
$k_1$, $k_2$, and $k_3$ are predetermined constants represented by the relative values of resistors 41, 44 and 47

Potentiometer 45, whose shaft is rotated by the inverse function of range, $$\sqrt{\frac{V}{R}}$$

multiplies Equation 1 by $$\sqrt{\frac{V}{R}}$$

to provide an azimuth deflection signal, $E_2$, to the gyroscope as follows $$E_2 = \sqrt{\frac{V}{R}} E_1 \qquad (2)$$

A similar computation provides the elevation deflection signal, $E_3$, at point 54:

$$E_3 = k_4 E_{el} - k_5 E'_{el} + k_6 G_{el} + k_7 \alpha \qquad (3)$$

where
$E_{el}$ is the signal of elevation deflection of the gyroscope
$E'_{el}$ is the signal of the elevation angle of the radar antenna
$G_{el}$ is the vertical gyroscope signal indicating the elevation effect of gravity on the fire control problem
$\alpha$ is the angle of attack produced by angle of attack indicator 85, and
$k_4, k_5, k_6,$ and $k_7$ are predetermined constants represented by the relative values of resistors 53, 56, 57 and 67, respectively Potentiometer 58 multiplies the summed signals from point 54 by the inverse range function, $$\sqrt{\frac{V}{R}}$$

to provide an elevation deflection signal, $E_4$, to the gyroscope as follows:

$$E_4 = \sqrt{\frac{V}{R}} E_3 \qquad (4)$$

Potentiometer 78, a linear potentiometer, provides an output to amplifier 79 to drive range coil 13 according to the inverse function of range, $$\sqrt{\frac{V}{R}}$$

An additional modification may be made in which the gyroscope of sighthead 30 is used to stabilize the radar antenna. In the ordinary self-tracking radar, gyroscopes are used to stabilize the radar antenna. This is called "space stabilization" within the art. The gyroscopes provide signals which are utilized to prevent loss of the target under adverse tracking conditions. Fig. 4 illustrates a method in which the sighthead gyroscope provides the space stabilization signals and the usual gyroscopes may be dispensed with.

In Fig. 4 the output of bridge detector resistors 37 and 38 is further connected through resistor 80 to the input of amplifier 69. Completion of the tracking loop includes a connection from pickoff 43 through resistor 81 to the input of amplifier 69. A similar connection is made for the elevation servo motor in which the output of resistors 49 and 50 is connected through resistor 82 to drive amplifier 72. The output of resolver 55 is connected in feedback loop through resistor 83 to drive amplifier 72.

These connections provide stabilization of the radar antenna in elevation and azimuth by use of gyroscope 30. In general, it may be said that the high gain loop is within the radar self-tracking circuit and that most of the control is obtained from the radar itself. Only in cases of sudden angular velocities would any signals of substantial magnitude be received from the gyroscopic sighthead through the lines illustrated as dotted.

A pilot situated at point 34 is able to view both the sighthead display and the radar display, indicator 65 showing the error between the radar antenna aim and the deflection of the gyroscope of the sighthead. The pilot thus has a blind firing method in which he uses the information as to the comparison between the gyro sighthead system and the radar system. This information is that displayed by the indicator. The sighthead display is stabilized and rendered more accurate by virtue of comparison of the sighthead with the radar information and the computation done by computer 33. The indicator picture is made more stable by reason of the fact that under larger angular velocities, the radar antenna is stabilized by gyroscopic sighthead 30.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a gyroscopic sighthead, a self-tracking radar system comprising a cooperatively associated radar antenna, a radar transmitter, and a radar receiver, means for controlling the deflection of said gyroscopic sighthead in response to the difference between the deflection of said sighthead and the aim of said antenna.

2. In combination, a gyroscopic sighthead, a self-tracking radar system comprising a cooperatively associated radar antenna, a radar transmitter, and a radar receiver, means for controlling the deflection of said gyroscopic sighthead in response to the difference between the deflection of said sighthead and the aim of said antenna, means for controlling the deflection of said gyroscope in response to the signal of target range provided by said radar.

3. In combination, a gyroscopic sighthead, a self-tracking radar system comprising a cooperatively associated radar antenna, a radar transmitter, and radar receiver, means for controlling the azimuth deflection of said gyroscopic sighthead in response to the difference between the azimuth deflection of said sighthead and the azimuth of said antenna, and means for controlling the elevation deflection of said gyroscope in response to the difference between elevation deflection of said gyroscopic sighthead and the elevation of said antenna.

4. In combination, a gyroscopic sighthead, a self-tracking radar system comprising a cooperatively associated radar antenna, a radar transmitter, and a radar receiver, means for controlling the deflection of said gyroscopic sighthead in response to the difference between the deflection of said sighthead and the aim of said antenna, means for controlling the deflection of said gyroscope in response to the signal of target range provided by said radar, indicator means connected to receive and display the difference signals between the deflection of said gyroscopic sighthead and the aim of said antenna.

5. In combination, a gyroscopic sighthead, a self-tracking radar system comprising a cooperatively associated radar antenna, a radar transmitter and a radar receiver, said radar unit providing signals representing target range, antenna azimuth and antenna elevation, means for controlling the azimuth deflection of said gyroscopic sighthead in accordance with the difference between the azimuth deflection of said gyroscope and the azimuth of said antenna, means for controlling the elevation deflection of said gyroscopic sighthead in accordance with the difference between the elevation deflection of said gyroscopic sighthead and the elevation of said antenna, means for controlling the deflection of said gyroscopic sighthead in response to a signal representing an inverse function of the target range signal received from said radar system.

6. In combination, a gyroscopic sighthead, a self-tracking radar system comprising a cooperatively associated radar antenna, a radar transmitter and a radar receiver, said radar system providing output signals representing target range, antenna elevation and antenna azimuth, computer means connected to said radar system to provide an inverse function of the target range signal provided by said radar system, means for controlling the azimuth deflection of said gyroscopic sighthead in accordance with the difference between azimuth deflection of said gyroscopic sighthead and the azimuth of said antenna, said difference signal being further modified by the output of said computer representing an inverse function of target range, means for controlling the elevation deflection of said gyroscopic sighthead in accordance with the difference between the elevation deflection of said gyroscopic sighthead and the elevation of said antenna, said difference signal further modified by the output of said computer representing an inverse function of the target range.

7. The combination recited in claim 6 wherein is included further means for controlling the deflection of said gyroscopic sighthead in accordance with the output of said computer representing an inverse function of the target range.

8. In combination, a gyroscopic sighthead, a radar system comprising a cooperatively associated radar antenna, a radar receiver and a radar transmitter, said radar system providing output signals representing antenna elevation and antenna azimuth, means for determining the difference between the azimuth deflection of said gyroscopic sighthead and the azimuth of said antenna, and means for determining the difference between the elevation deflection of said gyroscopic sighthead and the elevation of the antenna of said radar, a computer connected to receive the output of said means for determining the differences and provide previously determined functions of said differences, and means for controlling the deflection of said sighthead in accordance with the output of said computer.

9. The combination recited in claim 8 wherein is included indicator means connected to receive and display the output of said means for determining the differences between said signals, whereby blind flying capabilities are included.

10. In a fire control system, a sighthead comprising a gyroscope, a radar system comprising a cooperatively associated radar antenna, a radar receiver and a radar transmitter, said radar system providing output signals representing target range, antenna azimuth and antenna elevation, means for determining the difference between the azimuth deflection of said gyroscope and the azimuth of the antenna of said radar, means for determining the difference between the elevation deflection of said gyroscope and the elevation of the antenna of said radar, computer means connected to receive the output of said means for determining the differences and further connected to receive the signal as to target range from said radar, said computer providing previously determined functions of said signals, means for controlling the deflection of said sighthead in response to the output of said computer.

11. In a fire control system, a sighthead comprising a gyroscope and a reticle controlled by the deflection of said gyroscope, a radar system comprising a cooperatively associated radar antenna, a radar receiver and a radar transmitter, said radar system providing output signals representing target range, antenna elevation and antenna azimuth, means for determining the difference between the azimuth deflection of said gyroscope and the azimuth of the antenna of said radar, means for determining the difference between the elevation deflection of said gyroscope and the elevation of the antenna of said radar, a computer connected to receive the output signals of said means for determining the differences, and further connected to receive the signal as to target range from said radar system and providing output signals which vary in accordance with an inverse function of said target range signal, and means for controlling the deflection of said gyroscope in accordance with the output of said computer.

12. The combination recited in claim 11 wherein is included indicator means connected to receive the output of said means for determining the differences, whereby blind-flying capabilities are included in said system.

13. The combination recited in claim 11 wherein said computer further comprises first means for summing signals representing other fire control factors and said signal representing the difference between azimuth deflection of said gyroscope and the azimuth of said antenna and said computer further comprises second means for summing signals representing other fire control factors to said signal representing the difference between the elevation deflection of said gyroscope and the elevation of said antenna, and said computer further comprises means for multiplying the outputs of said first and second summing means by said signal representing an inverse function of range.

14. In combination, a sighthead comprising a gyroscope, pickoff means indicating the deflection of said gyroscope, torquing means for controlling the deflection of said gyroscope, a radar system comprising cooperatively associated radar antenna, radar transmitter and a radar receiver, servo means for directing said radar antenna, said servo means comprising means for indicating the aim of said antenna, means for determining the difference between the output of said pickoff means and the means indicating the aim of said antenna, computer means providing an output responsive to the output of said means for determining the difference and further responsive to the signal as to target range provided by said radar, said torquing means connected to be responsive to the output of said computer means.

15. In a fire control system, a gyroscope sighthead, an elevation deflection coil, an azimuth deflection coil, an elevation pickoff, an azimuth pickoff, a self-tracking radar system providing signals representing target range, antenna elevation error and antenna azimuth error, said radar system comprising cooperatively associated radar antenna, radar transmitter and radar receiver, servo means for directing said radar antenna in elevation according to antenna elevation error signals provided by said radar receiver, servo means for directing said antenna in azimuth according to the antenna azimuth error signals provided by said radar receiver, said servo means further comprising pickoff means providing signals which indicate the antenna azimuth and elevation, means for determining the difference between the output of said elevation pickoff on said gyroscope and said pickoff means indicating the elevation of said antenna, means for determining the difference between said azimuth pickoff on said gyroscope and said pickoff means indicating the azimuth of said antenna, computer means connected to receive and provide signals responsive to the outputs of said means for determining the differences, said computer further comprising means connected to receive the range signal output of said radar receiver and provide a signal representing an inverse function of range, the output of said computer connected to control said elevation deflection coil and said azimuth deflection coil.

16. The combination recited in claim 15 wherein said computer further comprises means for multiplying each of the outputs of said means for determining the differences by said computed signals representing an inverse function of range.

17. The combination recited in claim 15 wherein said computer further comprises means for adding signals representing predetermined factors affecting the fire control problem to the outputs of said means for determining the differences and thereby provide summed signals, and said computer further comprises means for multiplying said computed signal representing the inverse function of range by said summed signals.

18. The combination recited in claim 15 wherein is included on said gyroscope, a range coil, said range coil being connected to receive the output signal of said computer representing inverse function of range.

19. The combination recited in claim 15 wherein is included a range coil, and wherein said computer further comprises means for adding signals representing predetermined factors affecting the fire control problem to said output signals from said means for determining the difference to thereby provide summed signals, and said computer further comprises means for multiplying said summed signals by said signal representing an inverse function of range, said range coil connected to be responsive to the output signal of said computer representing an inverse function of range and said azimuth and elevation deflection coils being connected to receive the output of said computer representing said summed signals multiplied by signals representing the inverse function of range.

20. A sighthead comprising a gyroscope, a range coil, an elevation deflection coil, an azimuth deflection coil, an elevation pickoff, an azimuth pickoff; a radar system comprising a cooperatively associated radar antenna, radar transmitter and a radar receiver, servo means responsive to the elevation error output of said radar receiver for directing said radar antenna in elevation, servo means responsive to the antenna azimuth error signal provided by said radar receiver for directing said antenna in azimuth, said radar receiver providing an output signal representing target range, said elevation servo means further comprising an elevation pickoff providing signals indicating antenna elevation, said azimuth servo means further comprising azimuth pickoff means providing signals representing antenna azimuth; means for determining the difference between said signals received from said antenna elevation pickoff and said gyroscope elevation pickoff; means for determining the difference between the signals received from said antenna azimuth pickoff means and said gyroscope azimuth pickoff; vertical gyro means providing a signal indicating the effect of gravity in azimuth and effect of gravity in elevation; means for summing the signal from said vertical gyro representing the effect of gravity in azimuth to the signal representing the difference between azimuth of said gyroscope and the azimuth of said antenna to thereby provide a summed signal; means for adding the output signal from said vertical gyroscope representing the effect of gravity on elevation to the signal representing the difference between the elevation of said antenna and the elevation of said gyroscope; means for providing a signal indicating the angle of attack; means for adding said signal representing the angle of attack to said signal representing the difference between elevation of said antenna and said vertical gyro and said signal representing the effect of gravity in elevation to thereby provide a summed signal; means connected to receive the output signal from said radar receiver representing target range and provide an inverse function thereof; means for multiplying said summed signals by said signal representing an inverse function of range; said range coil connected to be responsive to said means providing a signal representing an inverse function of range, said elevation and azimuth deflection coils being connected to be responsive to said multiplied summed signals.

21. In combination, a sighthead comprising a gyroscope, pickoff means indicating the deflection of said gyroscope, torquing means for controlling the deflection of said gyroscope, a self-tracking radar system comprising cooperatively associated radar antenna, a radar transmitter and a radar receiver, servo means for directing said radar antenna in response to the antenna error signals received from said radar receiver, said servo means comprising means providing signals indicating the aim of said antenna, means for determining the difference between the output of said pickoff means and said means providing signals indicating the aim of said antenna, computer means responsive to the output of said means for determining the difference and further responsive to the signal as to target range provided by said radar, and said torquing means connected to be responsive to the output of said computer means, and further means connecting the output of said pickoff means indicating deflection of said gyroscope to said servo means.

22. In combination, a sighthead comprising a gyroscope, pickoff means indicating the deflection of said gyroscope, torquing means for controlling the deflection of said gyroscope, a radar system comprising cooperatively associated radar antenna, radar transmitter and a radar receiver, servo means for directing said radar antenna, said servo means comprising means for indicating the aim of said antenna, means for determining the difference between the output of said pickoff means and the means indicating the aim of said antenna, computer means providing an output responsive to the output of said means for determining the difference and further responsive to the signal as to target range provided by said radar, said torquing means connected to be responsive to the output of said computer means, and further means connecting the signal from said pickoff means on said gyroscope to said servo means for directing said radar antenna.

23. In a fire control system, a gyroscope sighthead, an elevation deflection coil, an azimuth deflection coil, an elevation pickoff, an azimuth pickoff, a self-tracking radar system providing signals representing target range, antenna elevation error and antenna azimuth error, said radar system comprising cooperatively associated radar antenna, radar transmitter and radar receiver, servo means for directing said radar antenna in elevation according to antenna elevation error signals provided by said radar receiver, servo means for directing said antenna in azimuth according to the antenna azimuth error signals provided by said radar receiver, said servo means further comprising pickoff means providing signals which indicate the antenna azimuth and elevation, means for determining the difference between the output of said elevation pickoff means on said gyroscope and said pickoff means indicating the elevation of said antenna, means for determining the difference between said azimuth pickoff means on said gyroscope and said pickoff means indicating the azimuth of said antenna, computer means connected to receive and provide signals responsive to the outputs of said means for determining the differences, said computer further comprising means connected to receive the range signal output of said radar receiver and provide a signal representing an inverse function of range, the output of said computer connected to control said elevation deflection coil and said azimuth deflection coil, and further means connecting the signal representing elevation deflection of said gyroscope to said servo means for directing said antenna in elevation, and means connecting the signal representing azimuth deflection of said gyroscope to said servo means for directing said antenna in azimuth.

References Cited in the file of this patent

UNITED STATES PATENTS

| | | |
|---|---|---|
| 2,684,007 | Newell | Sept. 23, 1943 |
| 2,707,400 | Manger | May 3, 1955 |
| 2,724,998 | Goertz | Nov. 29, 1955 |
| 2,733,006 | Babcock | Jan. 31, 1956 |
| 2,737,652 | White et al. | Mar. 6, 1956 |
| 2,752,684 | Bentley et al. | July 3, 1956 |